Feb. 28, 1956 K. G. POTTER 2,736,491

TRIGONOMETRY FUNCTION CALCULATOR

Filed July 26, 1954 2 Sheets-Sheet 1

INVENTOR:
Kenneth G. Potter

By Herbert E. Metcalf
His Patent Attorney

Feb. 28, 1956 K. G. POTTER 2,736,491

TRIGONOMETRY FUNCTION CALCULATOR

Filed July 26, 1954 2 Sheets-Sheet 2

INVENTOR:
Kenneth G. Potter

By Herbert E. Metcalf
His Patent Attorney 2,736,491

TRIGONOMETRY FUNCTION CALCULATOR

Kenneth G. Potter, Hermosa Beach, Calif., assignor to Northrop Aircraft, Inc., Hawthorne, Calif., a corporation of California Application July 26, 1954, Serial No. 445,767

4 Claims. (Cl. 235—61)

This invention relates generally to calculators and more particularly to a trigonometry function calculator. The invention is also related to training aids, the calculator being especially proficient in graphically demonstrating relationships existing between the different basic trigonometric functions and any angle.

The values for trigonometric functions for all angles between 0 to 90 degrees is sufficient to provide complete data for any other angle. Sine values, tangents, etc., are in such frequent present day use that tables listing values for these functions are commonplace. Very often, however, values of these functions are only desired and necessary accurately to two or three decimal places. A useful calculator would be one which can provide these values in a single simple operation. It would be particularly practical and its utility is greatly enhanced if the device would simultaneously demonstrate clearly the relationship inherently existing between an angle and the different trigonometric functions.

It is, accordingly, an object of the present invention to provide means for graphically displaying trigonometric functions and values thereof for any angle.

Another object of the invention is to provide a calculator which can supply values, simultaneously, of all the trigonometric functions for any angle.

Another object of the invention is to provide means wherein a single, simple operation can produce trigonometric function data for any angle from 0 to 90 degrees.

A further object of this invention is to provide a visual training aid for portraying clearly graphical relationships existing between the several fundamental trigonometry functions and any angle.

Briefly, the foregoing and other objects are preferably accomplished by providing an assembly of four particularly constructed plates having interconnection means coupling two of these plates together to produce a suitable relative motion between plates whereby markings inscribed on the different plates can be correctly brought into superimposed position to indicate simultaneously the values of the trigonometric functions for any angle. The first (top) plate is a rotatable transparent quadrant sector having a pointer marking and a tangent and cotangent scale inscribed on a line intersecting with the pointer. The next plate is preferably constructed in the form of a circular disc having a quadrant sector cutout therein. A secant scale and a cosecant scale are inscribed along the radial edges of the cutout and an angle scale is inscribed around (near) the circular edge of the cutout sector. The next, or third, plate located behind the disc is a substantially rectangular plate having two connecting pivot arms anchored to a fourth back plate. These arms restrict movement of the rectangular plate to a combined vertical and lateral motion. The back plate is fixedly secured to the second disc plate. A sine scale and a cosine scale are inscribed on the rectangular plate such that these scales intersect at right angles with the radial edges of the cutout in the second (disc) plate. The top quadrant sector plate is coupled to the rectangular plate such that angular movement of the sector plate causes the rectangular plate to describe an arc without rotation about the pivot point of the quadrant sector plate whereby the sine and cosine scales always intersect at right angles with the radial edges of the cutout in the second plate. An angle setting of the top sector plate with pointer indicating against the angle scale at a selected angle produces mutual intersections of axes for the different trigonometry scales which, for proper scale markings, are at values of the trigonometric functions for that angle. A triangular plate can be affixed perpendicularly to the fourth (back) plate to provide a standard for the device.

The invention possesses other objects and features, some of which together with the foregoing, will be set forth in the following description of a preferred embodiment of the invention, and the invention will be more fully understood by reference to the accompanying drawings, in which.

Figure 1:
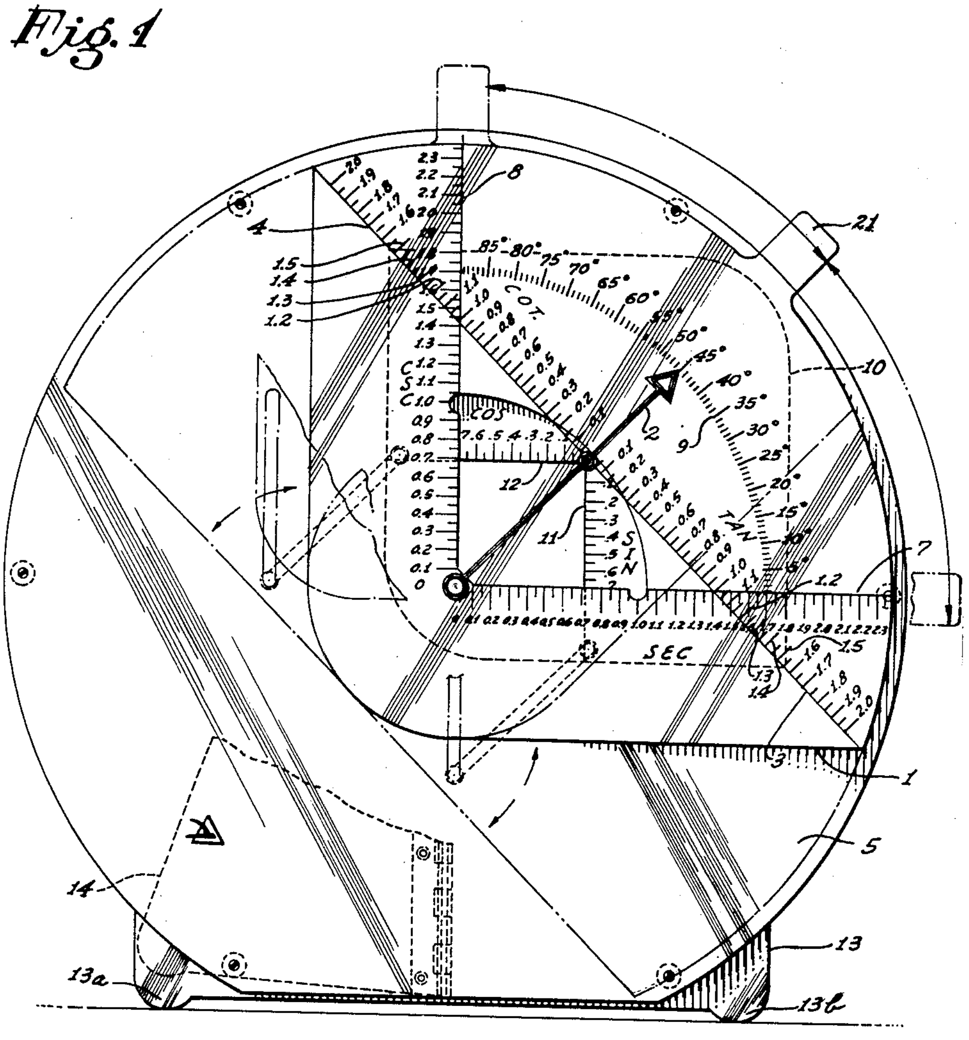
Figure 1 is a frontal, plan view of the invention wherein the arrangement and construction of the trigonometric function scales are clearly shown.

Referring first to Figure 1, there is shown a frontal, plan view of a preferred embodiment of the invention. The configuration illustrated in this figure was used as a training aid and measured nearly 14 inches across in diameter. Scales for the six trigonometric functions can be seen in their proper relationship with respect to a common angular scale which is calibrated in degrees. The construction of this device, however, can be more clearly described with reference to Figures 2, 3 and especially 4. Consequently, all four figures should be jointly referred to when reading the ensuing description.

Figure 4:
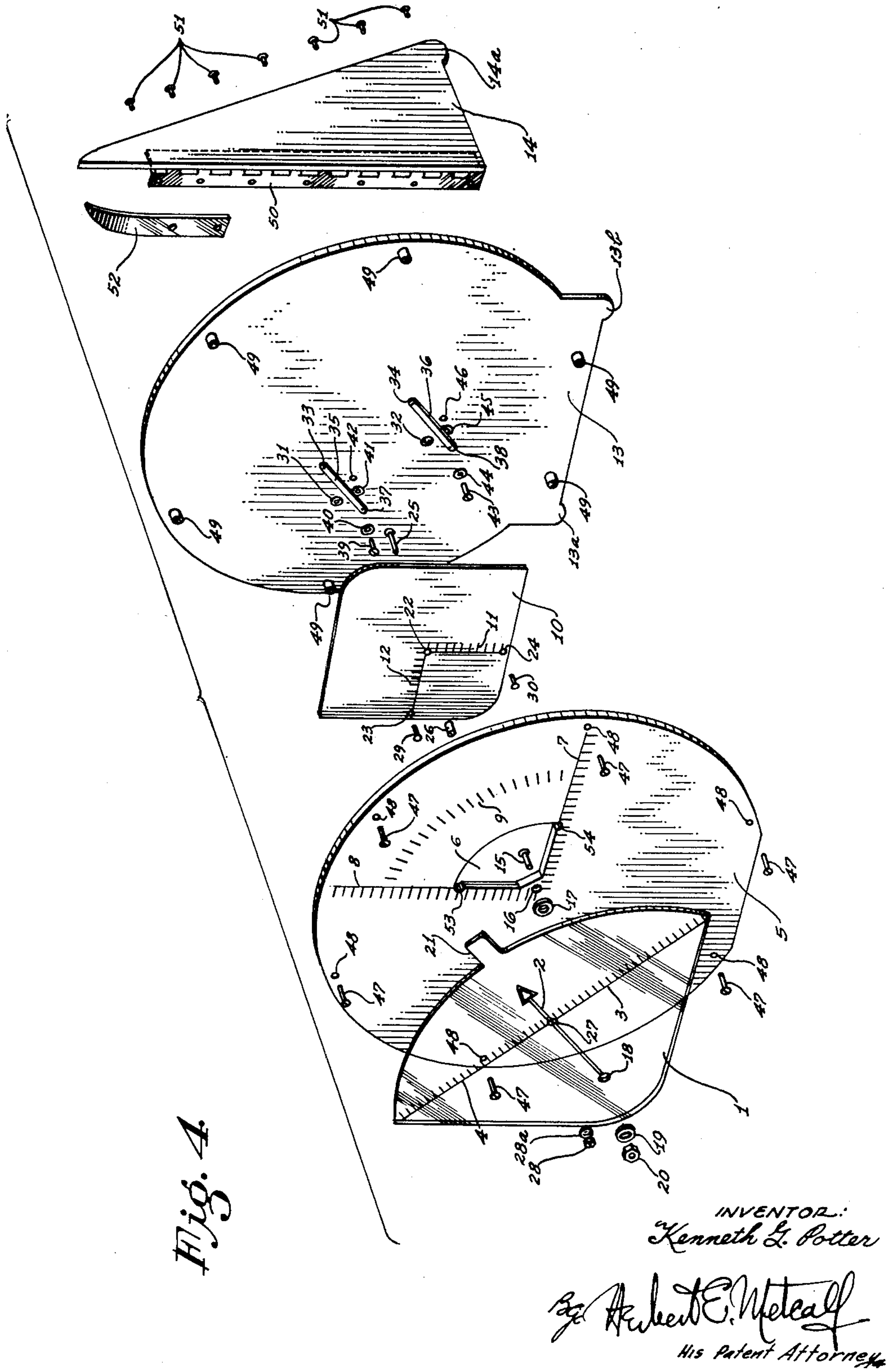
Figure 4 is an exploded view of a preferred embodiment of the invention which clearly illustrates the construction thereof.

The trigonometry function training aid, or calculator, comprises four essential parts which are distinctly shown in Figure 4. These parts are, from front to back, first, a transparent quadrant sector plate 1 bearing an inscribed pointer 2, a tangent scale 3 and a cotangent scale 4. Second, this is followed by an opaque disc 5 having a central quadrant aperture 6 cut out of disc 5 substantially as shown. Secant scale 7, cosecant scale 8 and angle scale 9 are inscribed on the surface of this disc 5. The third part is an opaque, rectangularly shaped plate 10, very nearly a square, which is inscribed with a sine scale 11 and a cosine scale 12. Fourth, and finally, there is a back plate or disc 13, preferably opaque and serves generally as a base plate. For the training aid version, this latter part (fourth) can be construed to include a hinged standard 14.

The quadrant sector 1 is preferably fabricated of clear plastic of 1/16 inch thickness, the markings thereon being scribed on top and filled with black paint. The opaque disc 5 can be machined from an off-white opaque plastic plate (which is clear plastic painted white on the back surface and sides) of, for example, 5/64 inch thickness. The scales 7, 8 and 9 are preferably produced by scribing the top clear surface and filling these grooves with black paint. Rectangular plate 10, however, is preferably manufactured from a colored plastic plate, for example, royal blue of 1/16 inch thickness, scribed on top and filled in with a bright yellow paint. The back plate 13 can be fabricated from plastic or aluminum. If plastic, a black opaque plate 3/16 inch thickness can be employed, for example, in the construction of both plates 13 and 14.

As is most clearly shown in Figure 4, the transparent quadrant sector plate 1 is secured adjacent and parallel to the plane of disc 5 by means of a screw 15 passing through a central hole 16 in disc 5, through washer 17, a pivot hole 18 in quadrant sector 1, through another washer 19 and finally engaging with a nut 20. Quadrant sector plate 1 can thus rotate on the bearing surface provided by screw 15 such that the end of pointer 2 will indicate along angle scale 9, as viewed through transparent sector 1. The quadrant sector 1 can be rotated by hand by means of tab 21 provided therefor.

Plate 10 has three holes 22, 23 and 24 drilled in it. Hole 22 is centered on the intersection of sine scale 11 and cosine scale 12. Plate 10 and quadrant sector plate 1 are coupled together by means of a screw 25 passed through hole 22, through a roller-spacer 26, through a hole 27 in sector plate 1 and a washer 28*a* threading with a nut 28.

The roller-spacer 26 rolls against the circular edge of aperture 6 and is stopped when the axis of screw 25 intersects either the cosecant 8 or secant 7 axes. The other two holes 23 and 24 are located respectively at the ends of the cosine scale 12 and the sine scale 11 on plate 10. Two small rivets 29 and 30 are passed through holes 23 and 24 respectively and through washers 31 and 32, through holes 33 and 34 near the ends of two arms 35 and 36 securing these arms to plate 10. There are also two other holes 37 and 38 at the ends of arms 35 and 36 respectively. A screw 39 passed through a washer 40, hole 37 and another washer 41 threads into a hole 42 made in back plate 13. Similarly, a screw 43 passed through a washer 44, hole 38 and another washer 45 threads into a hole 46 in back plate 13. The location of hole 42 is in line with the axis of the secant scale and hole 46 is located in line with the cosecant axis when disc 5 is superposed over and secured to back plate 13. The length of arms 35 and 36 is equal to the length of the sine and cosine scales.

Figure 2:
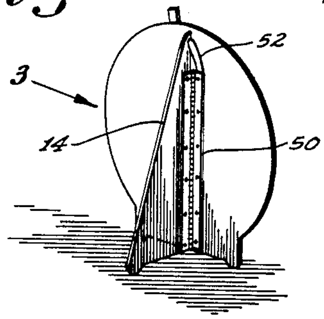
Figure 2 is a perspective which illustrates the standard provided, for example, for the calculator assembly.
Figure 3:
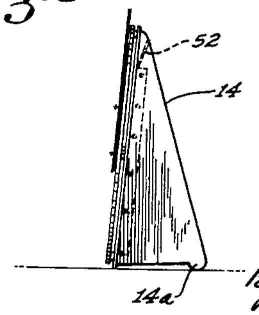
Figure 3 is a side view of the device in the direction of the arrow as indicated in Figure 2.

Six screws 47 passing through equally separated holes 48 countersunk in disc 5 and spacers 49 thread into back plate 13 and secure disc 5 to plate 13. Also attached to plate 13 is a half of a hinge 50 secured thereto by screws 51. A curved-over leaf spring 52 is interposed between the top end portion of hinge 50 and back plate 13 such that the curved (bent) end extends above the top of hinge 50, as shown in Figures 2 and 3. Triangular shaped standard plate 14 is secured to the other half of hinge 50. The thickness of standard plate 14 prevents it from folding flat in any other direction except against leaf spring 52 and only then maintaining spring 52 in a compressed condition. The bent portion of spring 52 is generally pressed down by hand before standard plate 14 can be folded over as indicated in Figure 1 to provide a more compact assembly. Normally the calculator stands with face slightly inclined backward (Figure 3) on three base knobs 13*a*, 13*b* and 14*b*, two on back plate 13 and one on standard plate 14.

Thus, there is provided an assembly wherein a quadrant sector 1 and a plate 10 are movable with respect to a disc 5 and plate 13 which remain fixed relative to the former parts. Quadrant sector plate 1 can be rotated on the axis of screw 15. This motion is transferred and imparted via screw 25 to plate 10 which is restricted to a combined translatory vertical and lateral movement by arms 35 and 36 rotating on pivot screws 39 and 43 respectively.

The end of pointer 2 indicates against angle scale 9 which is viewed through transparent sector plate 1. This is clearly illustrated in Figure 1. The angle scale 9 covers a range from 0 to 90 degrees; every five degrees being properly labeled. The tangent scale 3 and the cotangent scale 4 are each inscribed on each side of a straight line intersecting orthogonally with pointer 2 on the axis of screw 25. The scale divisions are the same (equal divisions) for all the trigonometric scales as shown. The tangent scale 3 and the cotangent scale 4 are both graduated in tenths from 0 to 2.0, for example, beginning from pointer 2 and are linear scales. Similarly, the secant scale 7 and cosecant scale 8 are inscribed on straight lines which intersect at right angles at the axis of pivot screw 15, these lines respectively coinciding with markings for 0 to 90 degrees of the angle scale 9. In Figure 1, these two scales 7 and 8 are shown graduated in tenths and include values from 0 to 2.3 for example, on linear scales. The scaled distance between the axes of pivot screw 15 and screw 25 along pointer 2 is 1.0.

Sine scale 11 and cosine scale 12 are inscribed on plate 10 on straight lines which intersect at right angles on the axis of roller-spacer 26. These scales 11 and 12 are marked in tenths linearly and, of course, include values between 0 and 1.0. The 0 values also lie on pointer 2. Since plate 10 is restrained to a combined translatory motion, the sine and cosine scales 11 and 12 will respectively remain vertical and horizontal as roller-spacer 26 is arcuately moved from the secant scale 7 to the cosecant scale 8. Semicircular notches 53 and 54 are provided at two corners of aperture 6 to accommodate roller-spacer 26 such that pointer 2 can indicate accurately against 0 or 90 degrees. These notches 53 and 54 limit the rotation of plate 10 as well as that of quadrant sector plate 1.

Readings for a selected angle are provided by the intersections of the different scales with each other. The sine and cosine readings are indicated respectively at the intersections with the axes of the secant and cosecant scales. A tangent reading and a secant reading are provided at their mutual intersection of axes and similarly, a cotangent reading and a cosecant reading are provided by the common intersection of these axes. An angle selection of 45 degrees, for example, is shown in Figure 1 and a sine and a cosine reading of approximately .71 can be read. The tagent and cotangent readings are observed to be 1.00 whereas the secant and cosecant readings are seen to be approximately 1.41. For an angle selection of 0 degrees, the sine and tangent would read 0 and the cosine and secant readings would be 1. However, the cotangent and cosecant readings are off scale and readings of infinity are obtained since the axes of these two scales are parallel. A 90 degree angle setting would yield analogous results in which tangent and secant readings are infinite, sine and cosecant are equal to 1 and cosine and secant readings are 0.

However, a simple means for providing values which are outside the present range of the calculator consists of inscribing the following formulae in a clear section on the face of the calculator.

$$\tan\theta = 1/\cot\theta = \sin\theta/\cos\theta$$
$$\cot\theta = 1/\tan\theta = \cos\theta/\sin\theta$$
$$\sec\theta = 1/\cos\theta$$
$$\csc\theta = 1/\sin\theta$$

These four functions—tangent, cotangent, secant and cosecant—are the only ones effected. Whenever the tangent scale reading is outside the existing range, the cotangent reading will be inside and easily read, and vice versa. This condition also exists with the secant and cosecant combination. Thus, a simple division operation may be occasionally involved which is not inconvenient.

There are many other obvious changes and improvements that can be added to the preferred embodiment of the invention shown, for example, inclusion of suitable verniers or construction with different materials and changes in size. By adding a telescope, mirror means and a bubble level, a highly useful training sextant may be obtained.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

What is claimed is:

1. A calculator for providing values of the basic trigonometry functions for any angle, comprising: a back plate; an intermediate plate provided with a sine scale and a cosine scale on axes meeting at right angles thereon; means connecting said intermediate plate adjacent and parallel to the face of said back plate, said connecting means restricting movement of said intermediate plate to a combined translatory motion along the axes of said sine and cosine scales; a frontal plate having a quadrant sector cutout therein, a secant scale and a cosecant scale provided along the radial edges thereof and an angle scale provided around the circular edge of said cutout; means for securing said frontal plate to said back plate before said intermediate plate, said frontal plate in superposed position oriented whereby the axes of said sine and cosine scales intersect at right angles with the axes of said secant and cosecant scales respectively; a transparent plate being provided with a pointer, a tangent scale and a cotangent scale provided on opposite halves of an axis intersecting said pointer at right angles thereon; means for rotatably mounting said transparent plate on an axis passing through the juncture of said secant and cosecant axes, said juncture lying in line with the axis of said pointer indicating against said angle scale viewed through said transparent plate; and means for coupling rotary motion of said transparent plate to said intermediate plate whereby mutual intersections of scale axes are effected for readings on said trigonometry function scales.

2. A calculator for providing values of the basic trigonometry functions for any angle, comprising: a back plate; a rectangular plate provided with a sine scale parallel one edge and a cosine scale parallel another edge, the axes of said sine and cosine scales meeting near the center of said rectangular plate; means connecting said rectangular plate adjacent and parallel to the face of said back plate, said connecting means restricting movement of said rectangular plate to a combined translatory motion along the axes of said sine and cosine scales; a frontal disc having a quadrant sector cutout therein, a secant scale and a cosecant scale provided along the radial edges thereof and an angle scale provided around the circular edge of said cutout; means for securing said frontal disc to said back plate before said rectangular plate, said frontal disc in superposed position oriented whereby the axes of said sine and cosine scales intersect at right angles with the axes of said secant and cosecant scales respectively; a transparent sector plate being provided with a pointer, a tangent scale and a cotangent scale provided on opposite halves of an axis intersecting said pointer at right angles thereon; means for rotatably mounting said transparent sector plate on an axis passing through the juncture of said secant and cosecant axes, said juncture lying in line with the axis of said pointer indicating against said angle scale viewed through said transparent sector plate; and means for coupling rotary motion of said transparent sector plate to said rectangular plate whereby mutual intersections of scale axes are effected for readings on said trigonometry function scales.

3. Apparatus in accordance with claim 2 wherein said connecting means include two connecting arms, an end of each arm being rotatably secured respectively to an edge point on the axes of said sine and cosine scales and the other end of each arm being rotatably secured respectively to said back plate on points in line with the axes of said cosecant and secant scales extended from the center of said quadrant sector cutout in superposed position whereby said rectangular plate is restricted to a combined translatory motion along the axes of said sine and cosine scales.

4. Apparatus in accordance with claim 2 wherein said transparent sector plate is provided with means for rotating said sector plate for setting said pointer on said angle scale.

References Cited in the file of this patent

UNITED STATES PATENTS

| | | |
|---|---|---|
| 623,835 | Schanz | Apr. 25, 1899 |
| 962,932 | Trum | June 28, 1910 |
| 1,341,560 | Johnson | May 25, 1920 |
| 1,955,392 | Shimberg | Apr. 17, 1934 |
| 2,078,138 | Hansen | Apr. 20, 1937 |
| 2,550,926 | Hertz | May 1, 1951 |